(12) United States Patent
Yoshimoto et al.

(10) Patent No.: US 8,228,568 B2
(45) Date of Patent: Jul. 24, 2012

(54) DOCUMENT READ APPARATUS AND IMAGE FORMING APPARATUS

(75) Inventors: Mitsuharu Yoshimoto, Osaka (JP); Yasuhiro Suto, Osaka (JP); Tomohiko Okada, Osaka (JP); Noritomo Nakashima, Osaka (JP); Kenji Tanaka, Osaka (JP); Shohichi Fukutome, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 577 days.

(21) Appl. No.: 12/469,038

(22) Filed: May 20, 2009

(65) Prior Publication Data

US 2009/0290200 A1    Nov. 26, 2009

(30) Foreign Application Priority Data

May 22, 2008    (JP) .................................. 2008-134612

(51) Int. Cl.
*H04N 1/04*    (2006.01)
*H04N 1/46*    (2006.01)

(52) U.S. Cl. .................... 358/475; 358/474; 358/538

(58) Field of Classification Search .................. 358/475, 358/538, 474; 362/617
See application file for complete search history.

(56) References Cited

U.S. PATENT DOCUMENTS

| 5,847,845 A * | 12/1998 | Takahashi et al. ............ 358/475 |
| 2007/0188825 A1 | 8/2007 | Suga |
| 2009/0225377 A1 * | 9/2009 | Yokota et al. ................. 358/474 |

FOREIGN PATENT DOCUMENTS

| JP | 64-029059 | 1/1989 |
| JP | 2002-314760 | 10/2002 |
| JP | 2006-180296 | 7/2006 |

* cited by examiner

*Primary Examiner* — Charlotte M Baker
*Assistant Examiner* — Rury Grisham
(74) *Attorney, Agent, or Firm* — Renner, Otto, Boisselle & Sklar, LLP

(57) ABSTRACT

The document read apparatus according to the present invention has a light source unit that includes a linear first light and second light sources, both light sources aligned parallel to the sub scanning direction (moving direction). When the light source unit is scanning a book document in a second region shifted toward a side of the first light source from a center position for emitting light to the center of the document, a light quantity of the second light source becomes larger than a light quantity of the first light source. When the light source unit is scanning the book document in a third region shifted toward a side of the second light source from the center position, the light quantity of the first light source becomes larger than the light quantity of the second light source. A sum of both light quantities is controlled to be constant.

15 Claims, 17 Drawing Sheets

FIG. 7

| | LIGHT RECEPTION RESULTS OF LIGHT RECEIVING ELEMENTS | | |
|---|---|---|---|
| DOCUMENT | R1 | R2 | R3 |
| B5R | 0 | 0 | 0 |
| B5 | 0 | 1 | 0 |
| B4 | 1 | 1 | 0 |
| A4R | 1 | 0 | 0 |
| A4 | 0 | 1 | 1 |
| A3 | 1 | 1 | 1 |

0 : NEGATIVE
1 : POSITIVE

SHADOW PART

DOCUMENT READ APPARATUS AND IMAGE FORMING APPARATUS

This Nonprovisional application claims priority under 35 U.S.C.§119(a) on Patent Application No. 2008-134612 filed in Japan on May 22, 2008, the entire contents of which are hereby incorporated by reference.

BACKGROUND OF THE INVENTION

1. Field of the Invention

The present invention relates generally to a document read apparatus for optically reading an image recorded on a document, in particular, to a document read apparatus and an image forming apparatus for reducing a degradation of quality of image read from a document, even when the document is in the form of a book.

2. Description of Related Art

A document read apparatus, such as a scanner or a copy machine, is widely used for optically reading an image recorded on a document and for generating image data. FIG. 15 is a schematic cross-sectional view showing a configuration of a conventional document read apparatus. The conventional document read apparatus includes: a transparent scanner platen 98 to place a document on; light source unit 90 having a light source 91, reflector 92 and a first mirror 93; second mirror 94, third mirror 95, lens 96 and an image sensor 97. The light source 91 is a linear light source that consists of a halogen lamp, xenon lamp or the like. FIG. 15 shows a cross-section that is perpendicular to a line of the light source 91. The image sensor 97 consists of a linear optical sensor, such as a charge coupled device (CCD) and a complementary metal oxide semiconductor (CMOS). A direction along the line of the light source 91 is referred to as a main scanning direction, while a direction perpendicular to the line of the light source 91 is referred to as a sub scanning direction. In FIG. 15, the main scanning direction is perpendicular to the plane direction of the figure, while the sub scanning direction is parallel to the longitudinal direction of the figure.

Light emitted from the light source 91 and light reflected from the reflector 92 are supplied to a document on the scanner platen 98. Light reflected by the document is reflected by the first mirror 93, second mirror 94 and the third mirror 95. The light is then focused by the lens 96 and received by the image sensor 97. In FIG. 15, light paths are represented by arrows. The image sensor 97 outputs image data representing one line image obtained by reading the document, in accordance with a received light quantity. The light source unit 90 moves in the sub scanning direction, while the second mirror 94 and the third mirror 95 moves in synchronization with the light source unit 90 and moves at half the speed of the light source unit 90 in the sub scanning direction. Thus, the document is sequentially read on a line-by-line basis. An image data on a page-by-page basis is generated by performing image processing on the image data outputted by the image sensor 97. If the conventional document read apparatus is a copy machine, an image recording process is performed in accordance with the image data. If the conventional document read apparatus is a scanner, the image data is sent to an external device. Japanese Patent Application Laid-Open No. 2002-314760 discloses an image read apparatus whose light source consists of plural point light sources, such as light emitting diodes (LEDs), arranged parallel to the main scanning direction.

SUMMARY OF THE INVENTION

The document read apparatus may read an image recorded on a document in the form of a sheet that completely and closely contacts the scanner platen 98 (sheet document), but also a document in the form of a book (book document). FIG. 16 is a schematic view showing a conventional document read apparatus reading an image recorded on the book document. When the book document is placed on the scanner platen 98, a binding margin of the book document is raised from the scanner platen 98, and a part of the book document containing the binding margin cannot closely contact the scanner platen 98. When light is emitted from the light source 91 to the book document in this situation, a light quantity of emitted light is smaller for the part of the book document containing the binding margin than for the remaining part of the book document, because the part of the book document containing the binding margin is farther away from the light source 91 than the remaining part of the book document. FIG. 17 is a schematic view showing a conventional image obtained by reading the book document. The one page image obtained by reading the book document includes a shadow part darker than the other part. A small amount of light is reflected by the part of the book document having small quantity of emitted light. Thus, the shadow part is generated in the one page image obtained by reading the book document.

In addition, the document read apparatus may read an image recorded on a document in the form of a sheet of a heavy paper (heavy paper document), such as a post card or a name card, that is thicker than a document in the form of a sheet of a normal recording paper. When a heavy paper document is read by a conventional document read apparatus, an obtained image may includes a shadow part corresponding to an edge of the heavy paper document which is darker than at the other part.

Japanese Patent Application Laid-Open No. 2002-314760 discloses a technique increasing a light quantity at the time of emitting light to a part corresponding to such shadow part during scanning a document. However, the technique disclosed by Japanese Patent Application Laid-Open No. 2002-314760 requires applying additional electrical currents. Thus, the technique may undesirably increase power consumption of a document read apparatus. Furthermore, when a light quantity is increased, light is emitted even to a part around a binding margin, the part closely contacting a scanner platen. Thus, the technique may undesirably obtain an image including a part too bright than the other part by reading a book document.

The present invention is made in view of such circumstances, and has a primary object to provide a document read apparatus and an image forming apparatus that enhance the image quality without increasing power consumptions, by properly adjusting light quantities to be emitted light to a document.

The document read apparatus according to an aspect of the present invention reads an image recorded on a document, and includes: light emitting means for emitting light to a document; movement means for moving the light emitting means in a predetermined moving direction with the light emitting means held to face the document; light reception means for receiving the light reflected by the document; and an optical system for conducting the light reflected by the document toward the light reception means; wherein, the light emitting means consists of a linear first light source and a linear second light source with their longitudinal directions perpendicular to the moving direction and are arranged in parallel to the moving direction; the optical system propagates light passing through between the first light source and the second light source, among the light reflected by the document, toward the light reception means; and the document read apparatus further comprises light quantity control means for separately controlling a light quantity from the first light source and a light quantity from the second light source.

In the present invention, it is possible to keep a constant power consumption and to change a light quantity ratio of the first light source and the second light source, for efficiently receiving light reflected by a part of a document that causes a shadow part on an image obtained by reading the document with a conventional technique, even if the document is a book document or a heavy paper document. Therefore, the present invention leads to advantages such that a shadow part becomes unlikely to be generated on an image obtained by reading a document, and that an image quality is enhanced without increasing power consumptions.

The above and further objects and features of the invention will more fully be apparent from the following detailed description with accompanying drawings.

BRIEF DESCRIPTION OF THE DRAWINGS

FIG. 7 is a table showing a relationship between a document size and a reception result of light receiving elements.

DESCRIPTION OF THE PREFERRED EMBODIMENTS

In the following, the present invention will be explained on the basis of drawings showing an embodiment thereof.

Figure 1:
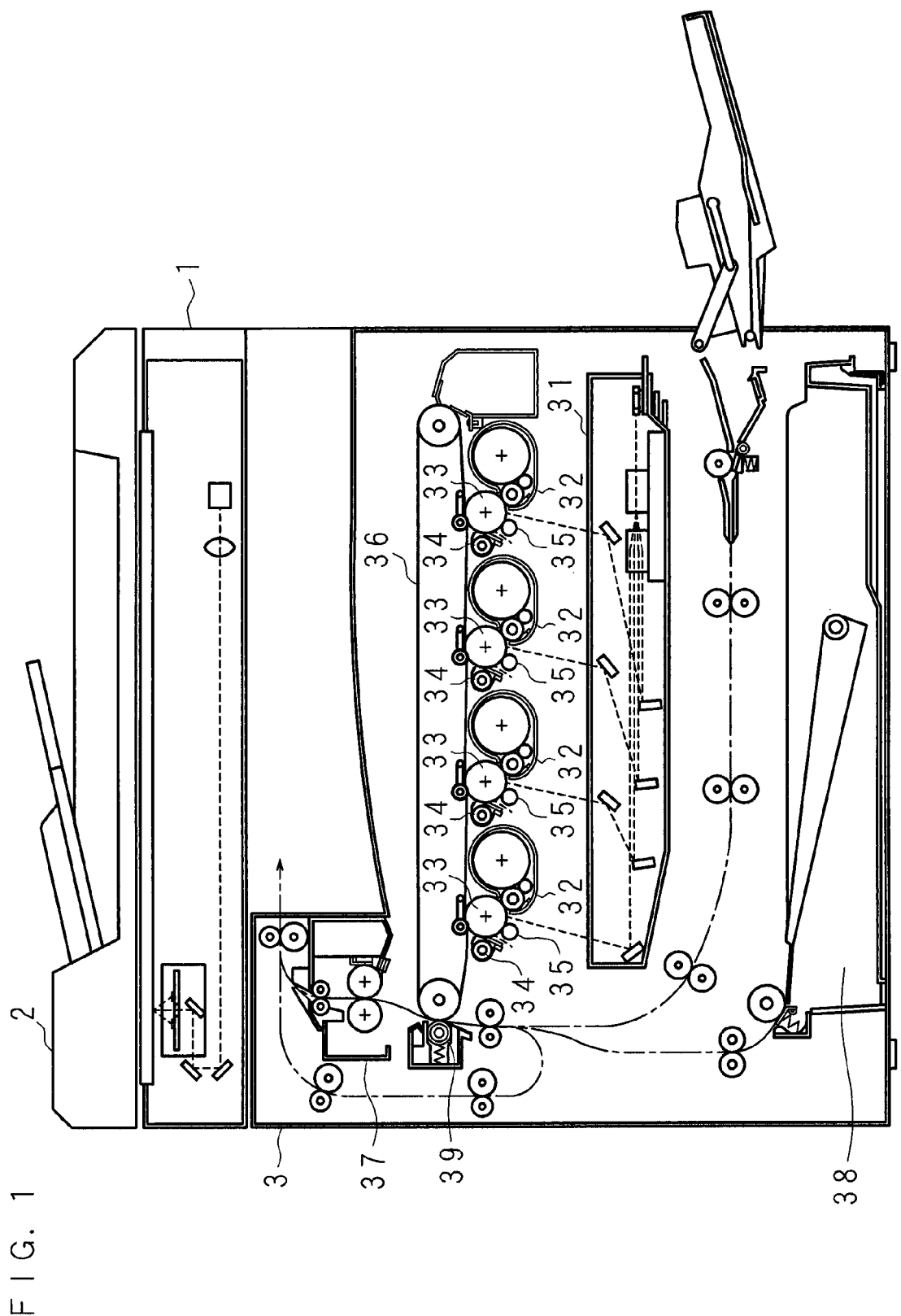
FIG. 1 is a schematic view showing an inner configuration of an image forming apparatus according to an aspect of the present invention.

FIG. 1 is a schematic view showing an inner configuration of an image forming apparatus according to an aspect of the present invention. The image forming apparatus includes: a document read unit 1 serving as a document read apparatus according to an aspect of the present invention; document sending unit 2 arranged above the document read unit 1; and an image record unit 3 arranged below the document read unit 1. The document read unit 1 is connected to the document sending unit 2 with hinges (not shown). The document sending unit 2 can be set in the open/closed position, with respect to the document read unit 1, through rotational movement of the hinges. The document read unit 1 is configured to optically read an image recorded on a placed document. The document sending unit 2 is configured to press a document placed on the document read unit 1 from above, when the document sending unit 2 is set in the closed position.

The image record unit 3 includes an exposure unit 31, developer 32, photoconductor drum 33, cleaner unit 34, charger 35, intermediate transfer belt unit 36, fixing unit 37 and a paper feeding cassette 38. One developer 32, photoconductor drum 33, cleaner unit 34 and one charger 35 are arranged for each color [black (K), cyan (C), magenta (M) and yellow (Y)] to form a latent image for each color. Thus, four image stations are arranged.

The exposure unit 31 is a laser scanning unit (LSU) including: a laser emitting unit that emits a laser beam; polygon mirror that sweeps the laser beam; reflection mirrors that conduct the laser beam to every photoconductor drum 33, and the like. The charger 35 uniformly charges the photoconductor drum 33 at a predetermined electrical potential. The exposure unit 31 emits the laser beam in accordance with image data. Thus, an electrostatic latent image is formed on the photoconductor drum 33. The developer 32 feeds toners of each color to the electrostatic latent image formed on the photoconductor drum 33, to form a toner image. In addition, the cleaner unit 34 removes and recovers residual toners on the surface of the photoconductor drum 33 after the toner image is developed and transferred.

The intermediate transfer belt unit 36 is arranged above the each photoconductor drum 33, and includes: an intermediate transfer belt; an intermediate transfer roller that transfers a toner image on each photoconductor drum 33 to the intermediate transfer belt, and the like. The intermediate transfer belt is an endless belt made of film having a thickness of, for example, about 100-150 μm. The transfer roller is a metal shaft (for example, stainless steel) whose surface is covered with conductive elastomer (for example, EPDM, urethane foam or the like). The metal shaft has a diameter of about 8-10 mm. The intermediate transfer belt is held at a position for contacting all the photoconductor drum 33, and is rotated. The transfer roller is applied with a high voltage transfer bias that has a polarity (+) opposite to a polarity of the toners (−). Toners on the photoconductor drum 33 are transferred onto the intermediate transfer belt by the transfer bias. A toner image of each color is formed on each photoconductor drum 33, and is sequentially transferred onto the intermediate transfer belt. Thus, a toner image of plural colors is formed on the intermediate transfer belt.

The image record unit 3 further includes a transfer roller 39 that transfers, onto a recording paper, a toner image formed on the intermediate transfer belt. The transfer roller 39 is arranged at a position for contacting the intermediate transfer belt, and is applied with a high voltage that has a polarity (+) opposite to a polarity of the toners (−). A recording paper is delivered from the paper feeding cassette 38. When the recording paper is delivered to a position of the transfer roller 39, the toner image of plural colors is transferred onto the recording paper. The recording paper is delivered to the fixing unit 37, after the toner image of plural colors is transferred. The fixing unit 37 then heats and pressurizes the recording paper having the transferred toner image, to fix the toner image on the recording paper. A fixation of a toner image on a recording paper means a record of an image on the recording paper. The recording paper is then outputted to an external, after the record of the image. In the embodiment described above, the image record unit 3 has formed a color image. It should be noted that the image record unit 3 may be configured to form a monochrome image.

Figure 2:
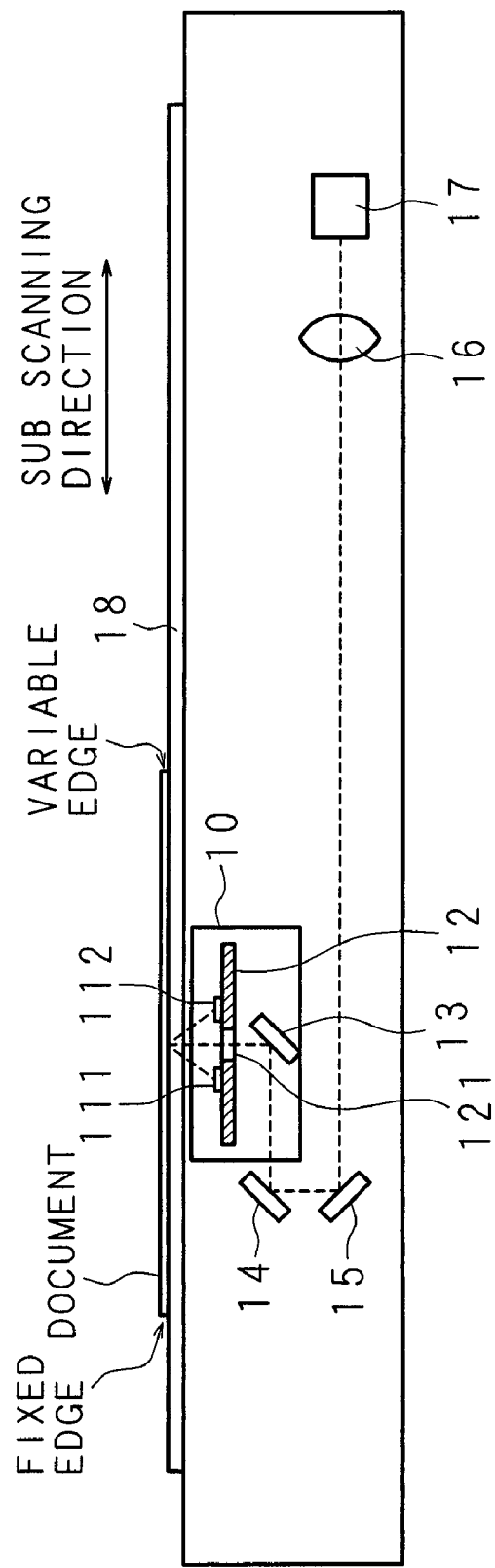
FIG. 2 is a schematic cross-sectional view showing a configuration of a document read unit.

FIG. 2 is a schematic cross-sectional view showing a configuration of the document read unit 1. The document read unit 1 includes a scanner platen 18 that consists of a transparent sheet glass on the upper surface. A document is placed face down on the scanner platen 18. Under the scanner platen 18, a light source unit 10 is arranged. The light source unit 10 includes a first light source 111, second light source 112, plate-shaped light source board 12 and a first mirror 13. The first light source 111 and the second light source 112 serve as a light emitting means according to an aspect of the present invention. In addition, the document read unit 1 includes a second mirror 14, third mirror 15, lens 16 and an image sensor (light reception means) 17. The image sensor 17 consists of a linear CCD having lined light receiving elements, such as photodiodes. A longitudinal direction of the image sensor 17 is referred to as a main scanning direction. It should be noted that the image sensor 17 may be a contact image sensor (CIS). The light source unit 10, second mirror 14 and the third mirror 15 are configured to be movable in a sub scanning direction across the main scanning direction. In FIG. 2, the main scanning direction is perpendicular to the plane of the figure, while the sub scanning direction is parallel to the longitudinal direction of the figure.

Figure 3:
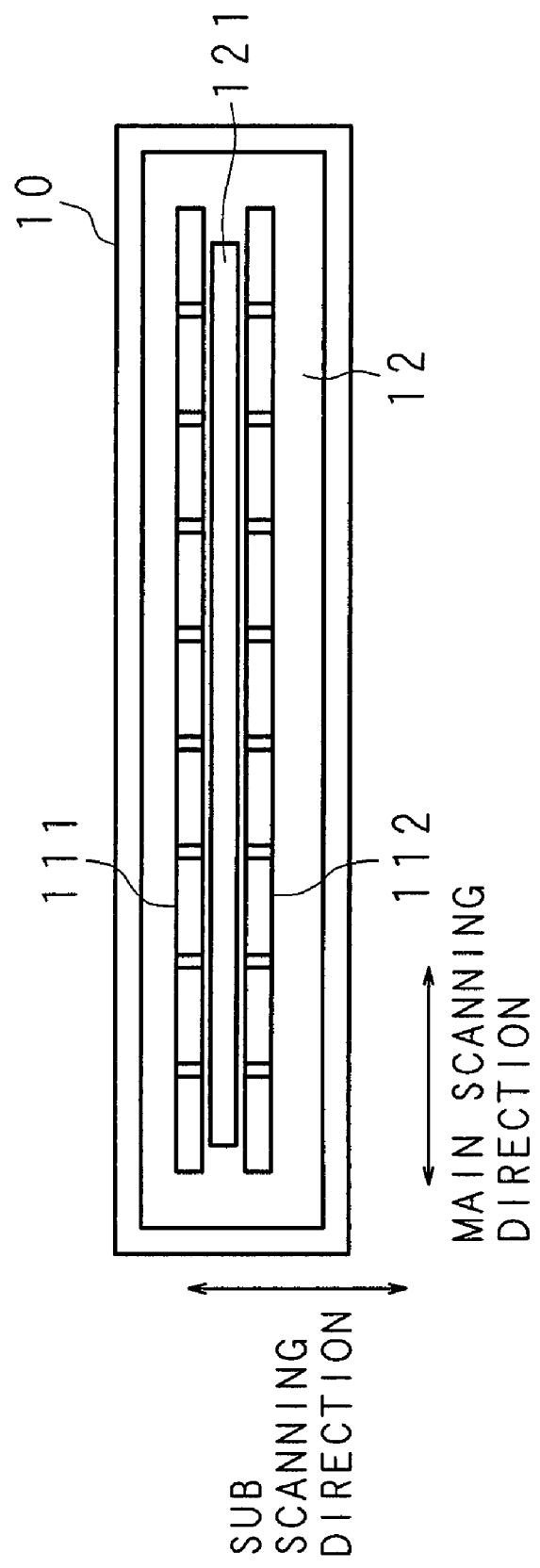
FIG. 3 is a schematic plan view showing a configuration of a first light source, second light source and a light source board.

FIG. 3 is a schematic plan view showing a configuration of the first light source 111, second light source 112 and a light source board 12. The light source board 12 is plate-shaped and is made of resin having outstanding rigidity and heat resistance. A slit 121 is formed on the light source board 12 along the main scanning direction. The slit 121 penetrats the plate-shaped light source board 12. Thus, the slit 121 allows light to pass from the upper side of the source board 12 to the lower side of the source board 12. The first light source 111, as well as the second light source 112, consists of a LED array in which plural LEDs for emitting white light are arranged in a line parallel to the main scanning direction. The linear first light source 111, as well as the second light source 112, is arranged on the upper surface of the light source board 12. Furthermore, the linear first light source 111 is arranged on one side of the slit 121 along the slit 121 and the second light source 112 is arranged on the other side of the slit 121 along the slit 121. In other words, longitudinal directions of the first light source 111 and the second light source 112 coincide with the main scanning direction, and the first light source 111 is aligned substantially parallel with the second light source 112 in the sub scanning direction. The sub scanning direction corresponds to the moving direction according to an aspect of the present invention. It should be noted that the first light source 111 and the second light source 112 may consist of rod-shaped halogen lamps or xenon lamps.

For reading an image recorded on a document, the document is placed face down on the scanner platen 18. Then, the document is scanned by the light source 10 moving in the sub scanning direction and emitting light. The light source unit 10 moves in the sub scanning direction at a constant speed, while the first light source 111 and the second light source 112 emit light to the document. In addition, the second mirror 14 and the third mirror 15 move in the sub scanning direction at half the speed of the light source unit 10. In other words, the first light source 111 as well as the second light source 112 is arranged at a position opposed to the document, emits light to the document from the position, and moves in the sub scanning direction in parallel to the document while emitting light. Light is emitted by the first light source 111 and the second light source 112, and is reflected by the document. A part of the reflected light by the document passes through the slit 121. The light passing through the slit 121 is conducted to the first mirror 13, and is reflected by the first mirror 13, second mirror 14 and the third mirror 15, sequentially. The light reflected by the third mirror 15 is focused through the lens 16 on the image sensor 17. The image sensor 17 converts the focused light into an electrical image data. In other words, the document read unit 1 is configured to receive only the light passing through a space between the first light source 111 and the second light source 112, among the light reflected by the document. The light source board 12, slit 121, first mirror 13, second mirror 14, third mirror 15 and the lens 16 correspond to the optical system according to an aspect of the present invention. The image data outputted by the image sensor 17 is line-by-line based image data representing one line image obtained by reading the document. The image sensor 17 sequentially outputs line-by-line based image data, in synchronization with the movement of the light source unit 10. Through scanning the whole document, plural line-by-line based image data are outputted. In accordance with the plural line-by-line based image data, one of page-by-page based image data is generated.

Usually, the scanner platen 18 has predefined positions to align one edge of a document in the main scanning direction and one edge of the document in the sub scanning direction at the time when the document is placed on the scanner platen 18. Thus, on the scanner platen 18, positions of the other end of the document in the main scanning direction and the other edge of the document in the sub scanning direction vary in accordance with a size of the document. Hereinafter, among edges of a document, an edge whose alignment position is predetermined is referred to as a fixed edge and an edge whose alignment position is varied in accordance with a size of the document is referred to as a variable edge. The document read unit 1 sequentially emits light to a document from the fixed edge side to the variable edge side while moving the light source unit 10, to scan the document. Although this embodiment has the first light source 111 and the second light source 112 that are arranged in the sub scanning direction, the first light source 111 is explained as being a light source arranged closer to the fixed edge side in the scanning direction of a document, for illustration purposes.

Figure 4:
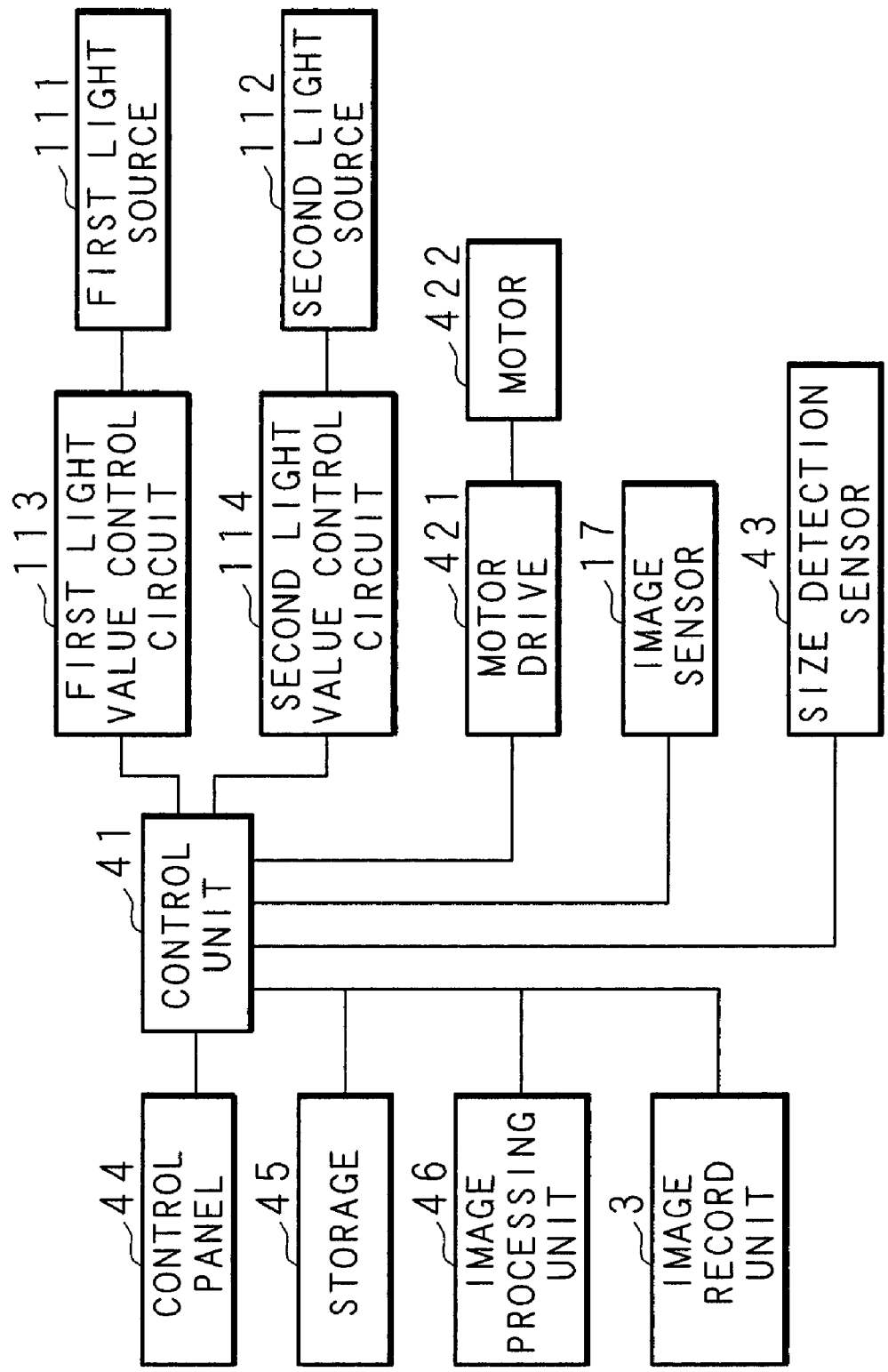
FIG. 4 is a block diagram showing a main portion of an electrical configuration of the image forming apparatus.

FIG. 4 is a block diagram showing main portions of an electrical configuration of the image forming apparatus. The image forming apparatus includes a control unit 41 that consists of: a CPU that performs computations; a RAM that stores information for the computations; a ROM that stores programs required for the computations and the like. The control unit 41 controls operations of each part of the image forming apparatus. The control unit 41 is connected to the first light source 111 through a first light quantity control circuit 113 and to the second light source 112 through a second light quantity control circuit 114. The control unit 41, first light quantity control circuit and the second light quantity control circuit 114 correspond to the light quantity control means according to an aspect of the present invention.

Figure 5:
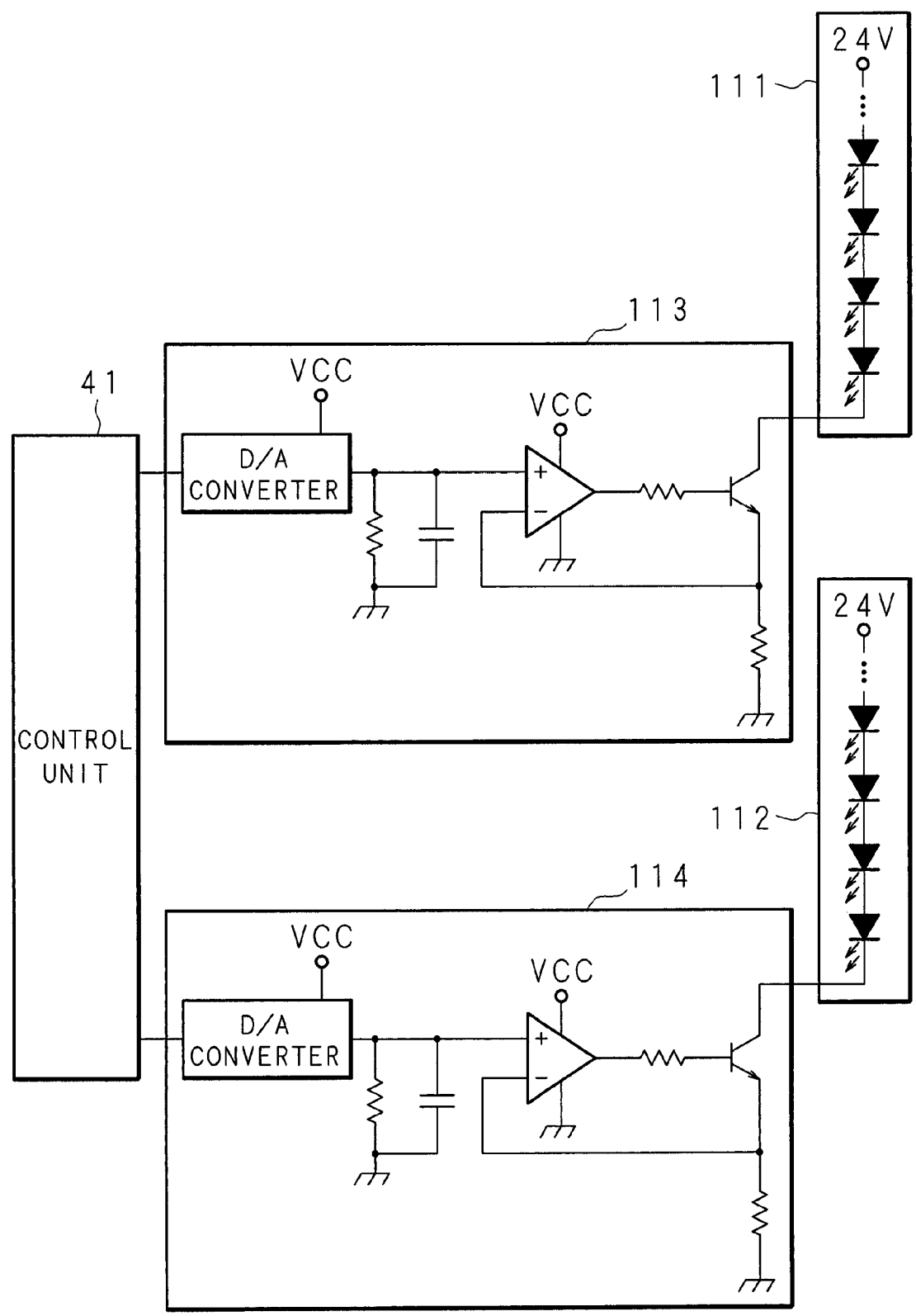
FIG. 5 is a circuit diagram showing an example of inner configurations of the first light source, second light source, first light quantity control circuit and a second light quantity control circuit.

FIG. 5 is a circuit diagram showing an example of inner configurations of the first light source 111, second light source 112, first light quantity control circuit 113 and the second light quantity control circuit 114. The first light source 111, as well as the second light source 112, consists of plural LEDs connected in series. The first light quantity control circuit 113 controls a light quantity of the first light source 111 by adjusting a current value supplied to the plural LEDs connected in series. In the same manner, the second light quantity control circuit 114 controls a light quantity of the second light source 112. The control unit 41 separately outputs control signals to the first light quantity control circuit 113 and the second light quantity control circuit 114. The control signals are converted into analog signals by D/A converters. Thus, a voltage applied to a LED is varied in accordance with a signal, and a current value flowing to the LED is adjusted. In other words, the control unit 41 separately controls operations of the first light quantity control circuit 113 that controls the light quantity of the first light source 111 and the second light quantity control circuit 114 that controls the light quantity of the second light source 112. Thus, these configurations lead to implementation of separate control of the light quantity of the first light source 111 and the light quantity of the second light source 112.

In addition, the image forming apparatus includes a motor 422 for moving the light source unit 10, second mirror 14 and the third mirror 15. The motor 422 is connected to the control unit 41 through a motor drive 421. The control unit 41 outputs a control signal to the motor drive 421, and then the motor drive 421 applies a drive voltage to the motor 422. The motor 422 rotates in response to the applied drive voltage, and moves the light source unit 10, second mirror 14 and the third mirror 15 back and forth in the sub scanning direction. The motor 422 consists of, for example, a stepping motor. The control unit 41 can control positions of the light source unit 10, second mirror 14 and the third mirror 15 by controlling the motor drive 421. The control unit 41, motor drive 421 and the motor 422 correspond to the movement means according to an aspect of the present invention. The control unit 41 further can detect the position of the light source unit 10 moved by the motor 422, in accordance with the control signals outputted to the motor drive 421.

Figure 6:
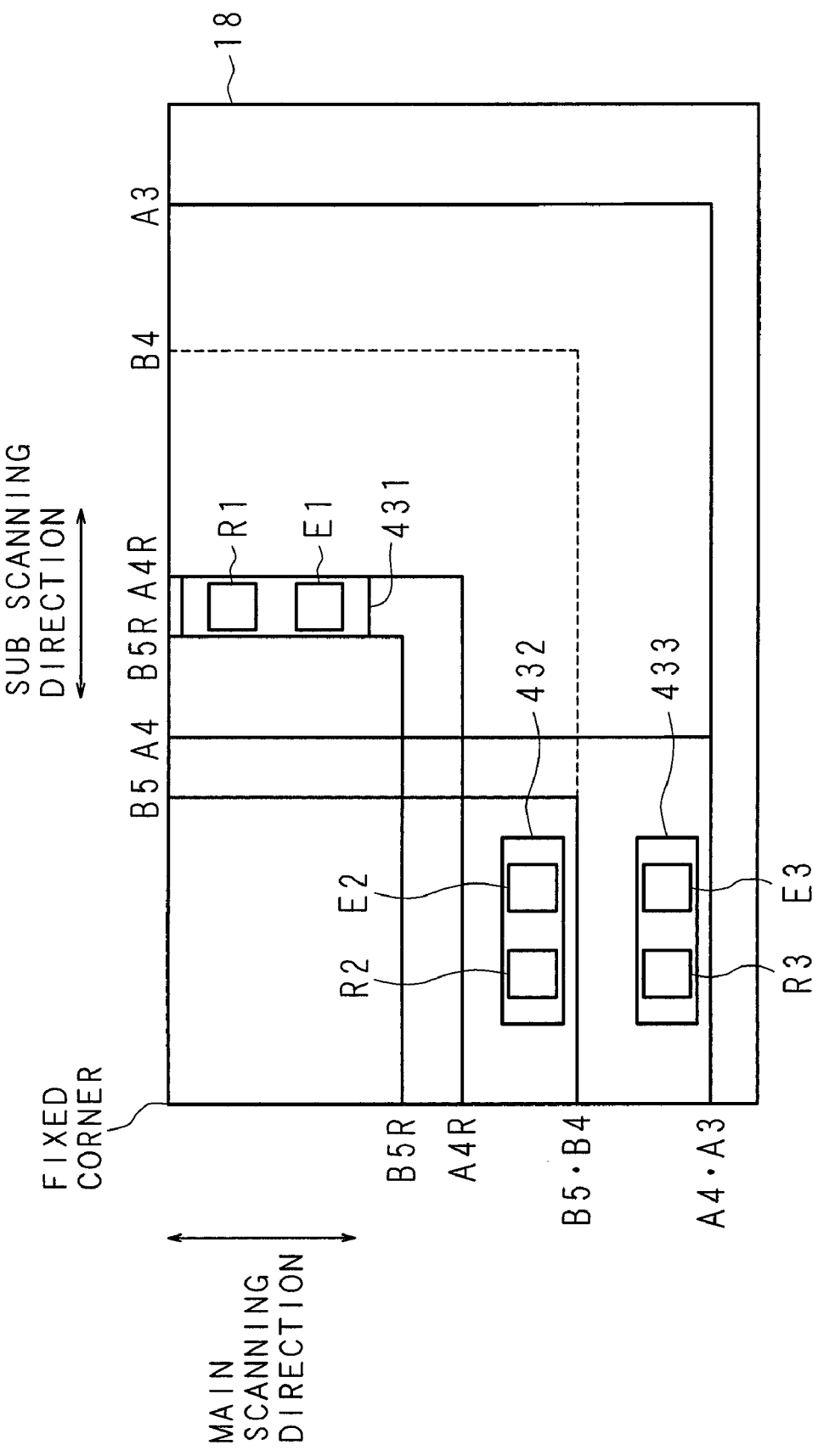
FIG. 6 is a schematic view showing an example of a configuration of a size detection sensor, seen from a top side of a scanner platen.

In addition, the control unit 41 is connected to the image sensor 17 and a size detection sensor 43. The size detection sensor 43 is for detecting a size of a document placed on the scanner platen 18, consists of plural optical sensors combined with light emitting elements and light receiving elements, and is arranged under the scanner platen 18. FIG. 6 is a schematic view showing an example of a configuration of the size detection sensor 43, viewed from a top side of the scanner platen 18. The scanner platen 18 is rectangular in a plan view. When a document is placed on the scanner platen 18, one corner of the document is defined to be aligned on a fixed corner that is a predetermined corner of the scanner platen 18. By the alignment of the corner of the document on the fixed corner, the fixed edge of the document in the main scanning direction, as well as the fixed edge of the document in the sub scanning direction, aligns on one edge of the scanner platen 18, and the position of the variable edge of the document varies in accordance with a size of the document.

In FIG. 6, this embodiment allows a B4 size document, as well as an A3 size document, to be placed with the longitudinal direction aligned on the sub scanning direction. Further, this embodiment allows a B5 size document, as well as an A4 size document, to be placed with the longitudinal direction aligned either on the main scanning direction or the sub scanning direction, whichever is preferred. An optical sensor 431 consists of a light emitting element E1 and a light receiving element R1, and is arranged at a site between a position corresponding to the variable edge in the sub scanning direction of a B5R size document having the longitudinal direction aligned on the sub scanning direction and a position corresponding to the variable edge in the sub scanning direction of an A4R size document having the longitudinal direction aligned on the sub scanning direction. An optical sensor 432 consists of a light emitting element E2 and a light receiving element R2, and is arranged at a site between a position corresponding to the variable edge in the main scanning direction of the A4R size document and a position corresponding to the variable edge in the main scanning direction of a B5 size document having the longitudinal direction aligned on the main scanning direction. An optical sensor 433 consists of a light emitting element E3 and a light receiving element R3, and is arranged at a site between a position corresponding to the variable edge in the main scanning direction of the B5 size document and a position corresponding to the variable edge in the main scanning direction of an A4 size document having the longitudinal direction aligned on the main scanning direction.

Each light emitting element emits light toward the scanner platen 18, in accordance with a control signal outputted by the control unit 41. When a document is placed on the scanner platen 18, the light receiving element receives the light reflected by the document. When a document is not placed on the scanner platen 18, the light receiving element cannot receive reflected light, because the light is not reflected by a document. The light emitted by the light emitting element E1 is received by the light receiving element R1. The light emitted by the light emitting element E2 is received by the light receiving element R2. The light emitted by the light emitting element E3 is received by the light receiving element R3. Each light receiving element outputs a signal representing positive or negative for the light reception. The control unit 41 detects a size of a document in accordance with each light reception result of each light receiving element.

FIG. 7 is a table showing a relationship between a document size and light reception results of the light receiving elements. In the table, "0" represents negative for the light reception and "1" represents positive for the light reception. For example, when the light reception results of all the light receiving elements are negative, a document is interpreted as being a B5R size document. When the light reception result of the light receiving element R1 is positive and the light reception results of the light receiving elements R2 and R3 are negative, a document is interpreted as being an A4R size document. When the light reception results of the light receiving elements R1 and R2 are positive and the light reception result of the light receiving element R3 is negative, a document is interpreted as being a B4 size document. The control unit 41 prepares a reference table as shown in FIG. 7, and detects a size of a document by specifying in the reference table a document size corresponding to each light reception result of each light receiving element. It should be noted that the control unit 41 may pre-scan a document placed on the scanner platen 18, edges of the document may be extracted from an image obtained by the pre-scanning, and that a size of the document may be calculated in accordance with positions of the edges in the obtained image.

Figure 8:
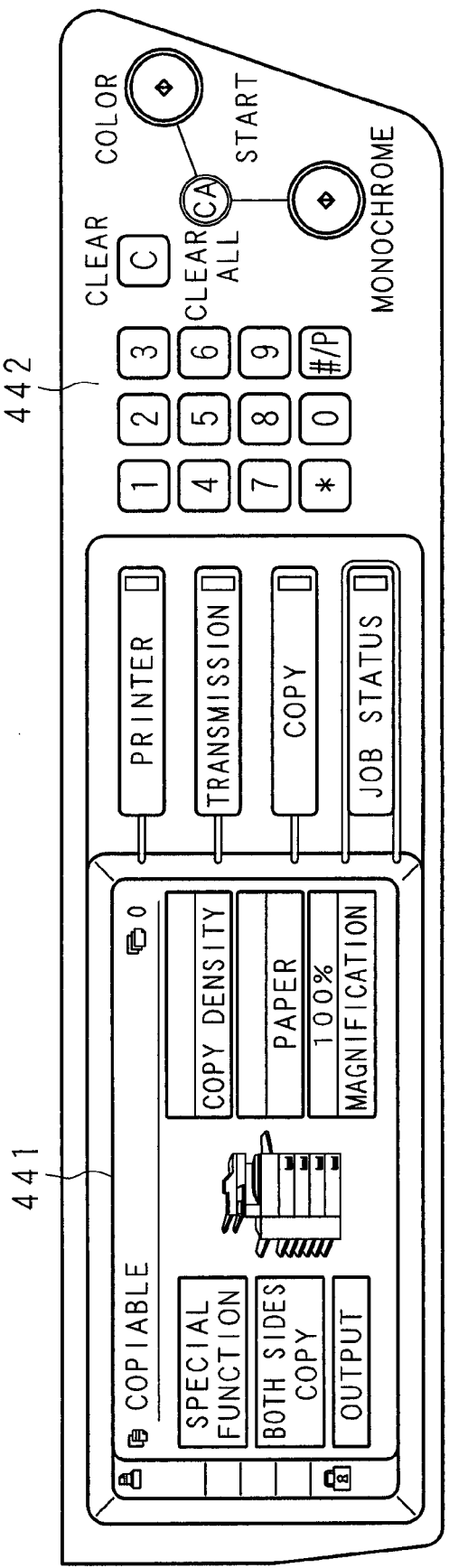
FIG. 8 is a schematic view showing an example of a control panel.

Further, the control unit 41 is connected to: a control panel 44 that accepts an instruction from a user; a storage 45 that stores image data; and an image processing unit 46 that generates image data and performs image processes, such as image editing. FIG. 8 is a schematic view showing an example of the control panel 44. The control panel 44 is configured with a touchscreen 441, numeric keypads 442 and the like, and accepts several instructions, such as start of an operation, through user's handling. The touchscreen 441 displays required information and accepts instructions from users. The image processing unit 46 generates one of the page-by-page based image data in accordance with plural line-by-line based image data outputted by the image sensor 17. The storage 45 consists of a semiconductor memory, hard disc, optical disc or the like, and stores image data generated by the image processing unit 46. The document read unit 1 includes the control unit 41, first light source 111, second light source 112, first light quantity control circuit 113, second light quantity control circuit 114, motor drive 421, motor 422, image sensor 17, size detection sensor 43, control panel 44, storage 45 and an image processing unit 46, and serves as the document read apparatus according to an aspect of the present invention. Furthermore, the control unit 41 is connected to the image record unit 3. The image record unit 3 forms an image based on the image data stored in the storage 45, and records the image on a recording paper.

Figure 9:
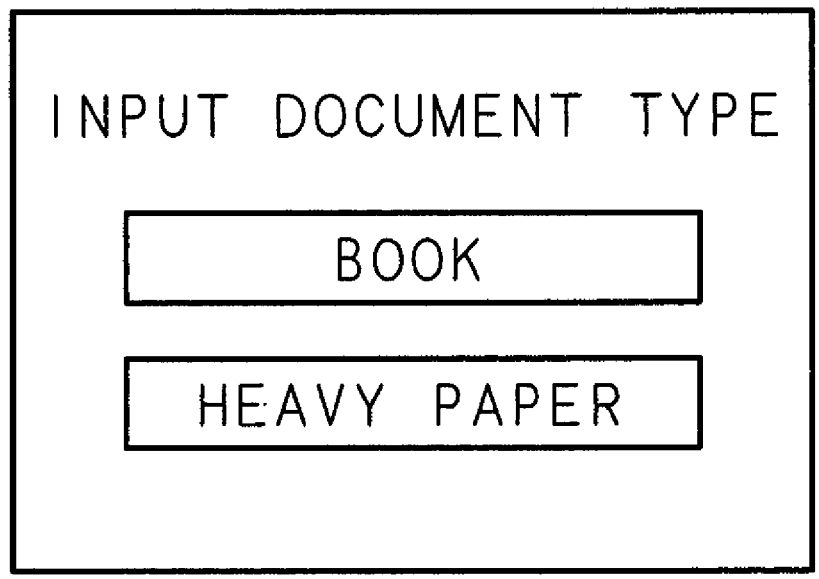
FIG. 9 is a schematic view showing an example of an input screen of the control panel for inputting an instruction specifying a type of a document.

Next, it is described about operations of the image forming apparatus configured as described above. The image forming apparatus according to an aspect of the present invention performs a procedure for reading a document while preventing generation of a shadow part in a read image, even when the document is a book document or a heavy paper document. When an image is read from a book document or a heavy paper document, a user inputs an instruction for specifying a type of a document as a book document or a heavy paper document through handling the control panel 44. FIG. 9 is a schematic view showing an example of an input screen of the control panel 44 for inputting an instruction specifying a type of a document. The figure illustrates a case that the input screen is displayed on the touchscreen 441. The instruction for specifying a type of a document is inputted by a choice of "book" or "heavy paper" on the input screen. A user handles the control panel 44 in a predetermined manner to display the input screen as shown in FIG. 9 on the control panel 44, and then inputs the instruction. In a case that the document is neither the book document nor the heavy paper document, such as a case that the document is a normal recording paper which records an image, the instruction is not required for specifying a type of the document.

A user places a document on the scanner platen 18 with aligning one corner of the document aligned on the fixed corner. If necessary, a user specifies a type of the document. Then, a user inputs an instruction for starting a read process through handling the control panel 44. In a case that the document is the book document, the book document is placed on the scanner platen 18 with the longitudinal direction of the book document aligned on the sub scanning direction. In this embodiment of the image forming apparatus, a book document is defined to be placed on the scanner platen 18 with the longitudinal direction of the book document aligned on the sub scanning direction.

Figure 10:
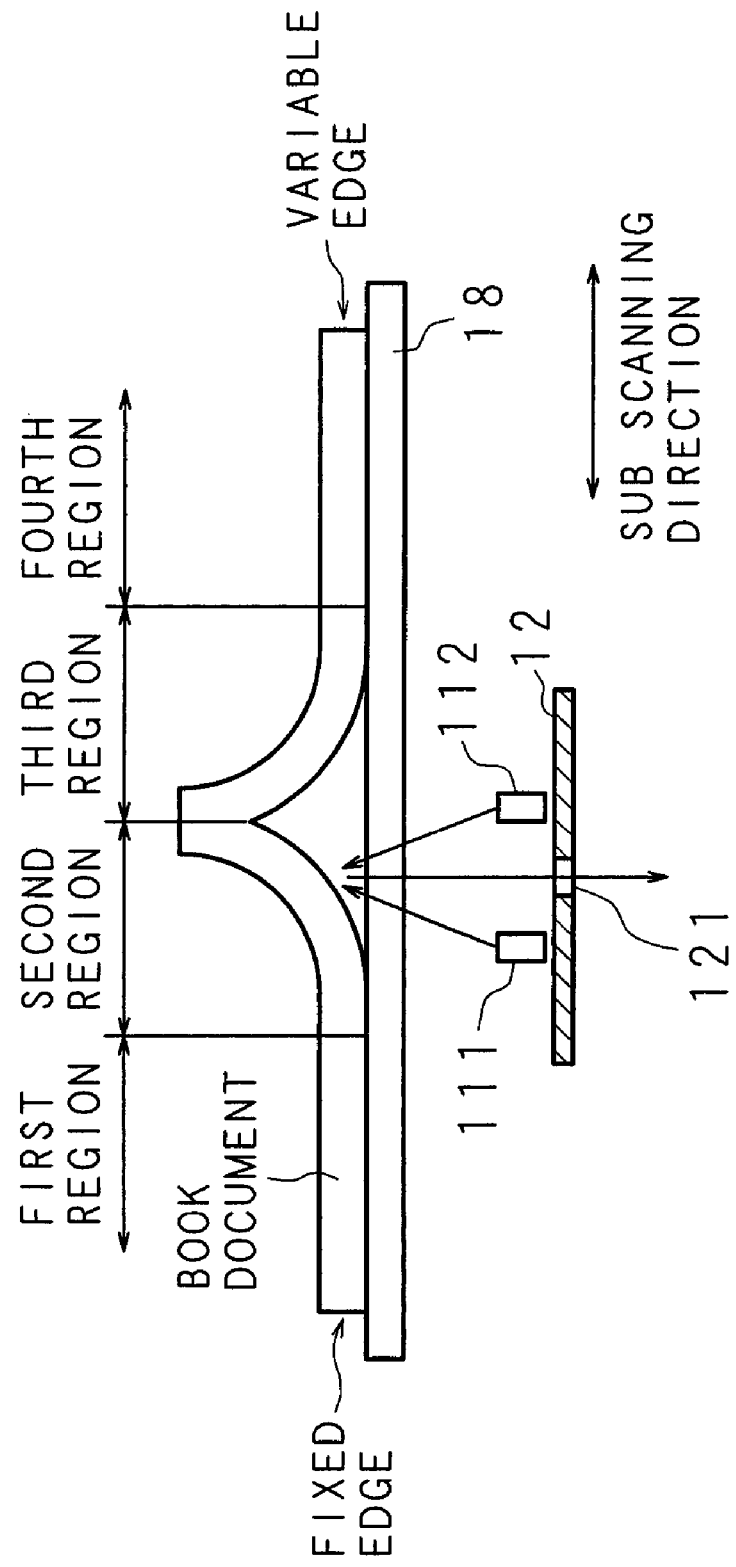
FIG. 10 is a schematic view showing a status in which a book document is placed on the scanner platen.

FIG. 10 is a schematic view showing a status placing a book document on the scanner platen 18. When a book document is placed on the scanner platen 18 with the longitudinal direction of the book document aligned on the sub scanning direction, a center part in the sub scanning direction of the book document is a binding margin which is raised from the scanner platen 18. In other words, a region extending a predetermined distance from the center toward the edge is raised from the scanner platen 18, and another region closer to the edge than the predetermined distance extending region closely contacts the scanner platen 18. A range of the region raised from the scanner platen 18 is somewhat different on the basis of individual book documents. However, the range can be determined in accordance with e.g., a size, thickness and a stiffness of the book document. Thus, an upper limit can be set in accordance with book documents expected to be used.

In this embodiment, a document is scanned sequentially from the fixed edge to the variable edge. A movable range of the light source unit 10 for emitting light to a document is assumed to include a first region, second region, third region and a fourth region, for illustration purposes. The first region refers to a region extending no less than a predetermined distance from the center toward a side of the first light source 111. The second region refers to a region extending less than the predetermined distance from the center toward the side of the first light source 111. The third region refers to a region extending less than a predetermined distance from the center toward a side of the second light source 112. The fourth region refers to a region extending no less than the predetermined distance from the center toward the side of the second light source 112. The predetermined distances are set in consideration of an enough range for covering a region of a book document raised from the scanner platen 18. Thus, when positioned in the first region or in the fourth region, the light source unit 10 emits light to a part of a document closely contacting the scanner platen 18. When positioned in the second region or in the third region, the light source unit 10 emits light to a part of a document including a region raised from the scanner platen 18.

Figure 11:
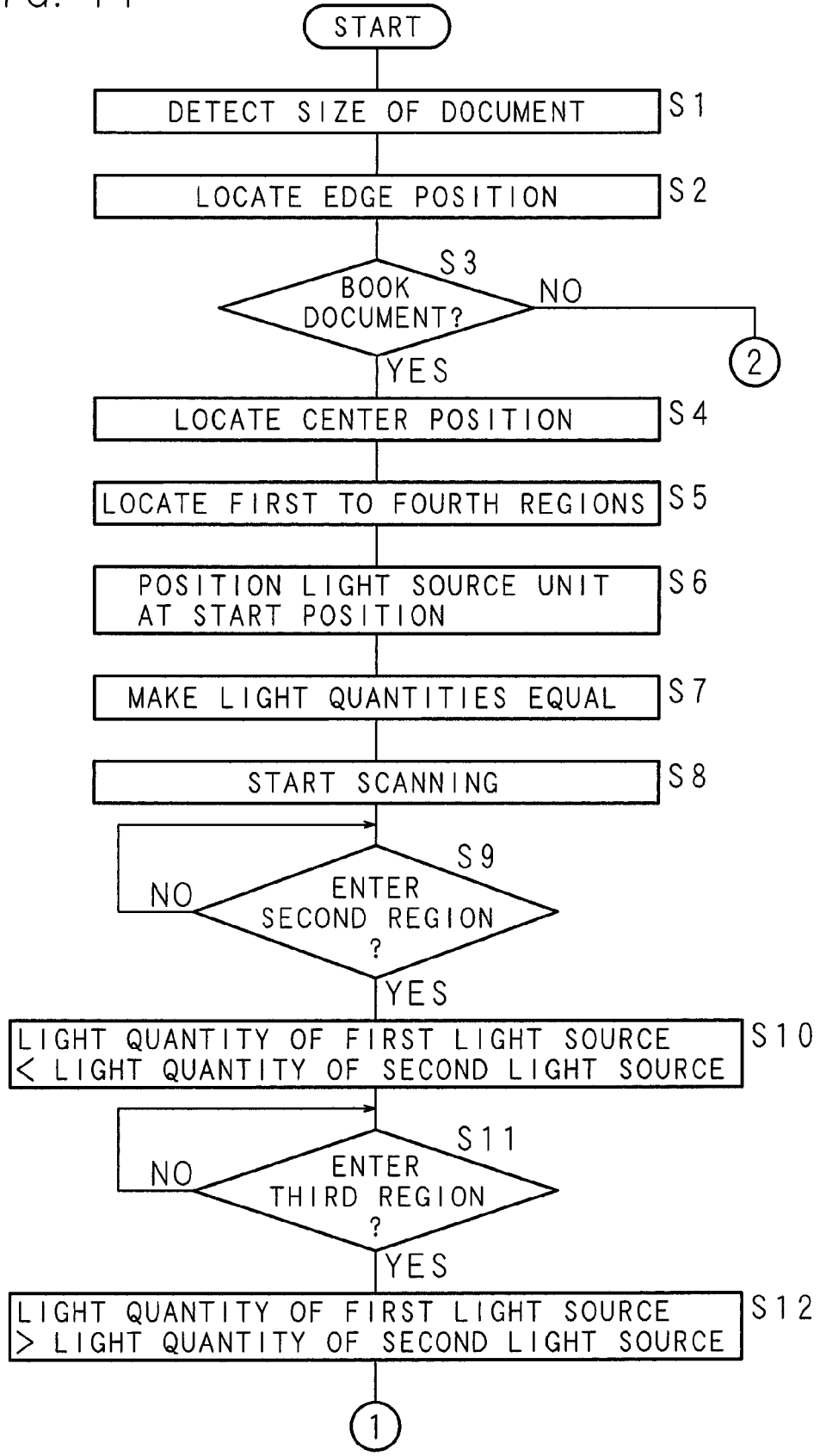
FIG. 11 is a flowchart showing a procedure performed by the image forming apparatus according to an aspect on the present invention.
Figure 12:
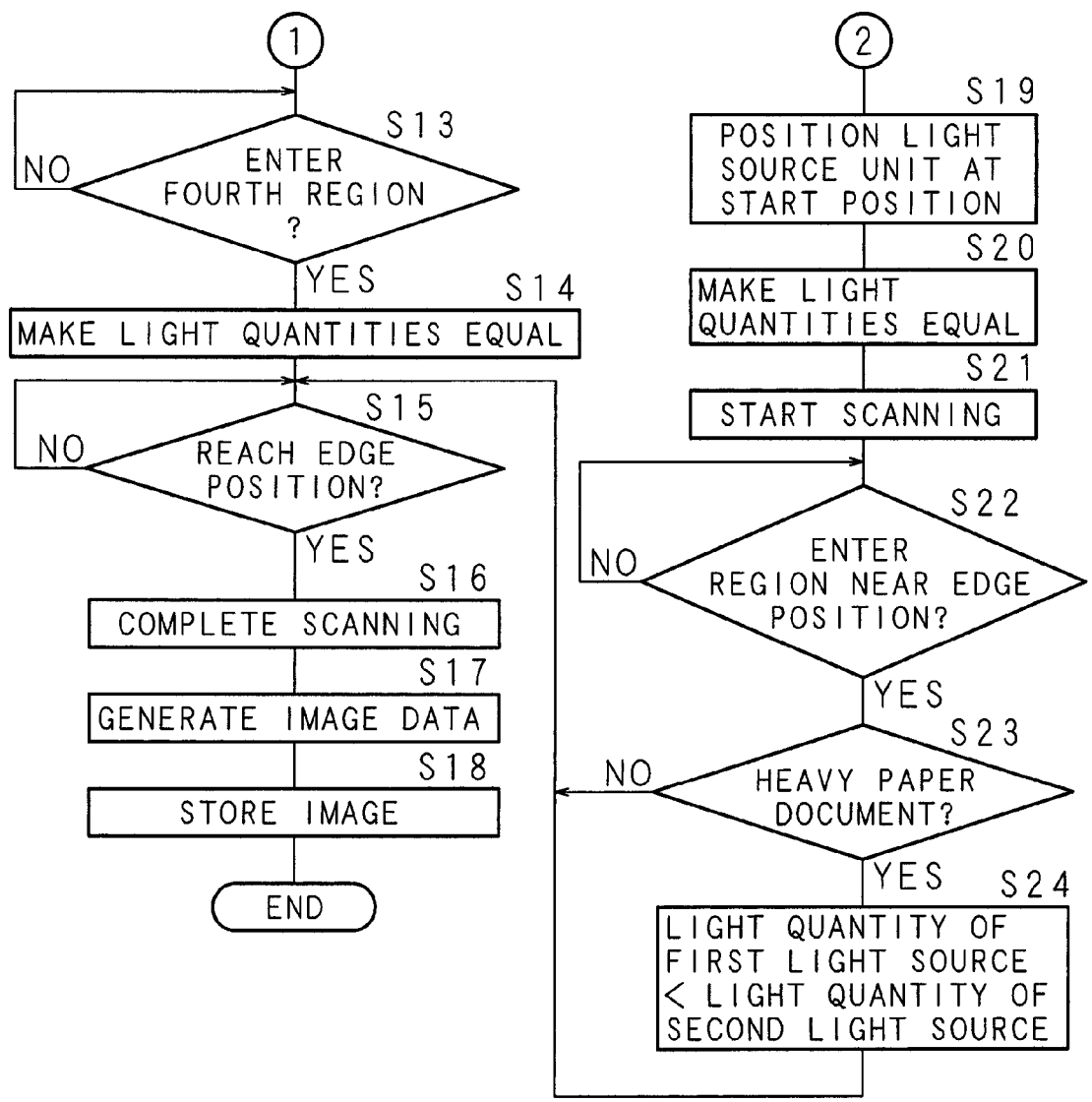
FIG. 12 a flowchart showing the procedure performed by the image forming apparatus according to an aspect on the present invention.

FIG. 11 and FIG. 12 are flowcharts showing a procedure performed by the image forming apparatus according to an aspect on the present invention. When having accepted an instruction for starting a read process from a user, the image forming apparatus performs several processes described below. Firstly, the control unit 41 of the image forming apparatus controls the size detection sensor 43 to perform a process for detecting the size of a document placed on the scanner platen 18 (S1). Specifically, in the process for detecting the size of a document, the control unit 41 outputs control signals to make the light emitting elements E1, E2, E3 emit light, receives light reception results of light receiving elements R1, R2, R3, and specifies in the table as shown in FIG. 7 a document size corresponding to each light reception result of each light receiving element. Thus, the size detection sensor 43 and the control unit 41 serve as a document size detection means.

Secondly, the control unit 41 locates an edge position of the light source unit 10 for emitting light to the variable edge of the document (S2). A variable edge of a document is defined in accordance with the size of a document. Thus, the edge position of the light source unit 10 is also defined for emitting light to the variable edge. The control unit 41 prepares correspondences between document sizes and edge positions of the light source unit 10. Thus, at step S2, the control unit 41 locates an edge position corresponding to a detected document size in accordance with the prepared correspondences, to locate the edge position of the light source unit 10. The edge position of the light source unit 10 for emitting light to the variable edge of the document means a position of the light source unit 10 where a maximum light quantity of light is emitted to the variable edge from the first light source 111 and the second light source 112. In the illustration shown in FIG. 2, the edge position is a position where the distance from the variable edge to the first light source 111 is the same as the distance from the variable edge to the second light source 112.

It should be noted that the image forming apparatus may detect the size of a document and locate the edge position with the use of different methods at step S1 and step S2. For example, the control unit 41 may pre-scan a document placed on the scanner platen 18, extract edges of the document from an image obtained by the pre-scanning, and calculates the size of the document and the edge position of the light source unit 10 in accordance with the positions of the edges in the obtained image. Alternatively, the image forming apparatus may accept document size information through the control panel 44 in response to use's handling, to recognize the size of a document, and then may locate the edge position of the light source unit 10 in accordance with the recognized size of the document.

Thirdly, the control unit 41 determines whether the document is a book document or not (S3). When the image forming apparatus has already accepted an instruction for specifying a type of the document as book document, the control unit 41 determines that the document is a book document. When the document is a book document (S3: YES), the control unit 41 locates a center position for emitting light to the center of the document in the sub scanning direction (S4). At step S4, the control unit 41 calculates half the length of a size of the document in the sub scanning direction, and calculates a position of the light source unit 10 that is shifted by the calculated half length in the sub scanning direction toward the variable edge from a position for emitting light to the fixed edge of the document, to locate the center position. The size of a document is detected, and a position for emitting light to the center of the document is calculated in accordance with the detected size. These configurations lead to advantages that facilitate responding to documents having several sizes.

It should be noted that the image forming apparatus may locate the center position with the use of different methods at step S3. For example, the control unit 41 may prepare information indicating center positions corresponding to document sizes. Thus, at step S3, the control unit 41 may read out the prepared information to locate the center position. Alternatively, the control unit 41 may pre-scan a document placed on the scanner platen 18, extract edges of the document from an image obtained by the pre-scanning, calculate a center position of the document in the sub scanning direction in accordance with the positions of the edges in the obtained image, and then may calculate the center position of the light source unit 10.

Next, the control unit 41 performs a process to locate the first to fourth regions as shown in FIG. 10 (S5). The control unit 41 prepares values of the predetermined distances. At step S5, the control unit 41 reads out the prepared values of the predetermined distances, calculates a position shifted by the predetermined distance toward a side of the first light source 111 from the center position, calculates a position shifted by the predetermined distance toward a side of the second light source 112, and stores the calculated positions, to locate the first to fourth region. It should be noted that the control unit 41 may prepare several predetermined distances which are different in accordance with document sizes, and may locate the first to fourth regions with the use of predetermined distances corresponding to the detected sizes of the documents.

Next, the control unit 41 controls the motor drive 421 to move the light source unit 10, and positions the light source unit 10 at a start position for scanning the document (S6). The start position for scanning the document correspond to a position of the light source unit 10 for emitting light to the fixed edge of the document. Next, the control unit 41 controls the first light quantity control circuit 113 and the second light quantity control circuit 114, to make the light quantity of the first light source 111 and the light quantity of the second light source 112 equal to each other (S7).

Next, the control unit 41 controls the first light quantity control circuit 113 and the second light quantity control circuit 114 to make the first light source 111 and the second light source 112 emit light, and starts a scanning of the document (S8); After step S8, the control unit 41 controls the motor drive 421 to drive the motor 422 and to move the light source unit 10, second mirror 14 and the third mirror 15. The motor 422 moves the light source unit 10 from a side of the fixed edge of the document to a side of the variable edge of the document along the sub scanning direction, and moves the second mirror 14 and the third mirror 15 at half the speed of the light source unit 10. Light emitted by the first light source 111 and the second light source 112 are directed to the document through the scanner platen 18. Then, light reflected by the document passes through the slit 121, is reflected by the first mirror 13 and the third mirror 15, and is received by the image sensor 17. The light source unit 10 moves in the sub scanning direction while the first light source 111 and the second light source 112 emit light. Thus, light is given to the document sequentially, and then the document is scanned. Immediately after the start of scanning, the light source unit 10 is kept in the first region. The light emitted by the first light source 111 is reflected by the document on equal terms with the light emitted by the second light source 112, and then received by the image sensor 17. The image sensor 17 sequentially outputs image data on a line-by-line basis, in accordance with the received light.

While scanning the document, the control unit 41 detects in accordance with the control signals outputted to the motor drive 421 a position of the light source unit 10 moved by the motor 422, to determine whether the light source unit 10 has entered the second region or not (S9). When the light source unit 10 is still in the first region (S9: NO), the control unit 41 repeats the process to determine the position of the light source unit 10, while scanning the document. When the light source unit 10 has entered the second region (S9: YES), the control unit 41 controls the first light quantity control circuit 113 and the second light quantity control circuit 114 to make the light quantity of the second light source 112 become more than the light quantity of the first light source 111, while keeping a constant sum of the light quantity of the first light source 111 and the light quantity of the second light source 112 (S10). For example, the control unit 41 adjusts a ratio of the light quantity of the first light source 111 and the light quantity of the second light source 112 in the first region to be 5:5 and the ratio in the second region to be 4:6, in order to keep the constant sum of the light quantities.

Figure 13A:
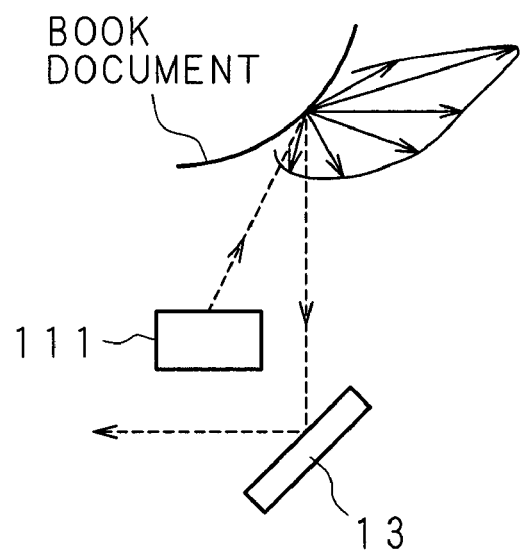
FIGS. 13A and FIG. 13B are schematic views showing statuses of light reflected by a book document when a light source unit is positioned in a second region.
Figure 13B:
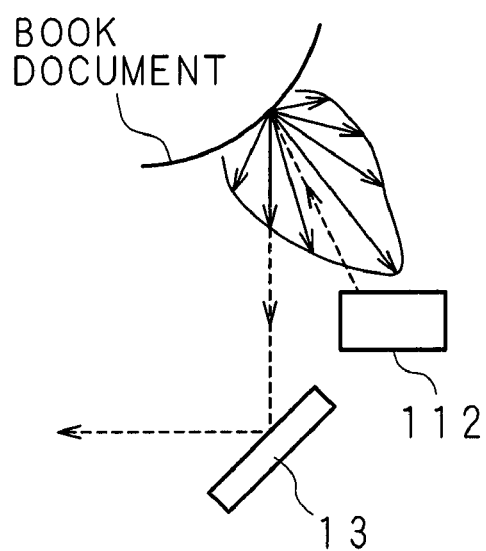

FIG. 13A and FIG. 13B are schematic views showing statuses of light reflected by a book document when the light source unit 10 is positioned in the second region. When the light source unit 10 is in the second region, the light emitted by the first light source 111 and the second light source 112 are reflected by a book document surface raised from the scanner platen 18 that is illustrated to slope up to the right in the figure. In FIG. 13A and FIG. 13B, solid arrows represent light reflected by a book document, and a curve line around the solid arrows represents a reflection intensity distribution. In addition, broken lines represent light emitted by the first light source 111 or the second light source 112 and light conducted to the first mirror 13 through the slit 121 among the light reflected by the book document. FIG. 13A shows a reflection intensity distribution of the light emitted by the first light source 111. FIG. 13B shows a reflection intensity distribution of the light emitted by the second light source 112.

The light emitted to the book document is diffusely reflected by the surface of the book document. In a reflection intensity distribution, the intensity is largest in a direction of a direct reflection of the emitted light. The light emitted by the first light source 111 reach the book document at shallower angle than the light emitted by the second light source 112. Thus, the direction of the direct reflection of the light emitted by the first light source 111 is greatly different from the direction of the reflected light conducted to the first mirror 13 through the slit 121. On the other hand, the second light source 112 is opposed to the book document surface, and the light emitted by the second light source 112 reach the book document at deeper angle than the light emitted by the first light source 111. Then, the direction of the direct reflection of the light emitted by the second light source 112 is close to the direction of the reflected light conducted to the first mirror 13 through the slit 121. Thus, even when the first light source 111 and the second light source 112 emit light with the same light quantities, the light quantity of the light conducted to the first mirror 13 from the second light source 112 is more than the light quantity of the light propagated to the first mirror 13 from the first light source 111. In addition, a decrease of the light quantity of the first light source 111 leads small amount of decrease of the light quantity received by the image sensor 17, while an increase of the light quantity of the second light source 112 leads large amount of increase of the light quantity received by the image sensor 17. Thus, when the light source unit 10 is in the second region, the increase of the light quantity of the second light source 112 leads to advantages to effectively receive by the image sensor 17 the light reflected by the part of the book document raised from the scanner platen 18, more than the increase of the light quantity of the first light source 111.

While continuing to scan the document, the control unit 41 detects in accordance with the control signals outputted to the motor drive 421 a position of the light source unit 10 moved by the motor 422, and determines whether the light source unit 10 has entered the third region or not (S11). When the light source unit 10 is still in the second region (S11: NO), the control unit 41 repeats the process to determine the position of the light source unit 10, while scanning the document. When the light source unit 10 has entered the third region (S11: YES), the control unit 41 controls the first light quantity control circuit 113 and the second light quantity control circuit 114 to make the light quantity of the first light source 111 become larger than the light quantity of the second light source 112, while keeping a constant sum of the light quantity of the first light source 111 and the light quantity of the second light source 112 (S12). For example, the control unit 41 adjusts a ratio of the light quantity of the first light source 111 and the light quantity of the second light source 112 in the first region to be 5:5 and the ratio in the third region to be 6:4, in order to keep the constant sum of the light quantities.

When the light source unit 10 is in the third region, the light emitted by the first light source 111 and the second light source 112 are reflected by a book document surface raised from the scanner platen 18 that slopes up contrary to the book document surface of the second region shown in FIG. 13A and FIG. 13B. The first light source 111 is opposed to the book document surface, and the light emitted by the first light source 111 reach the book document at deeper angle than the light emitted by the second light source 112. The light emitted by the second light source 112 reach the book document at shallower angle than the light emitted by the first light source 111. Thus, the light quantity of the light conducted to the first mirror 13 from the first light source 111 is larger than the light quantity of the light conducted to the first mirror 13 from the second light source 112. Thus, when the light source unit 10 is in the third region, making the light quantity of the first light source 111 become larger than the light quantity of the second light source 112 leads to advantages to efficiently receive by the image sensor 17 the light reflected by the part of the book document raised from the scanner platen 18.

While continuing to scan the document, the control unit 41 detects in accordance with the control signals outputted to the motor drive 421 a position of the light source unit 10 moved by the motor 422, and determines whether the light source unit 10 has entered the fourth region or not (S13). When the light source unit 10 is still in the third region (S13: NO), the control unit 41 repeats the process to determine the position of the light source unit 10, while scanning the document. When the light source unit 10 has entered the fourth region (S13: YES), the control unit 41 controls the first light quantity control circuit 113 and the second light quantity control circuit 114 to make the light quantity of the first light source 111 and the light quantity of the second light source 112 equal to each other, while keeping a constant sum of the light quantity of the first light source 111 and the light quantity of the second light source 112 (S14).

While continuing to scan the document, the control unit 41 detects in accordance with the control signals outputted to the motor drive 421 a position of the light source unit 10 moved by the motor 422, and determines whether the light source unit 10 has reached the edge position or not (S15). When the light source unit 10 has not reached the edge position yet (S15: NO), the control unit 41 repeats the process to determine the position of the light source unit 10, while scanning the document. When the light source unit 10 has reached the edge position (S15: YES), the control unit 41 controls the first light quantity control circuit 113 and the second light quantity control circuit 114 to make the first light source 111 and the second light source 112 stop emitting light, after scanning the variable edge of the document, and then completes the scanning of the document (S16). Next, the control unit 41 controls the image processing unit 46 to generate image data on a page-by-page basis, in accordance with the line-by-line image data sequentially outputted by the image sensor 17 (S17). Then, the control unit 41 controls the image record unit 3 to store an image based on the image data (S18), and completes the procedure.

When the document is not a book document (S3: NO), the control unit 41 controls the motor drive 421 to move the light source unit 10 with the use of the motor 422, positions the light source unit 10 at a start position for scanning the document (S19). Next, the control unit 41 controls the first light quantity control circuit 113 and the second light quantity control circuit 114, to make the light quantity of the first light source 111 and the light quantity of the second light source 112 equal to each other (S20), makes the first light source 111 and the second light source 112 emit light, and starts a scanning of the document (S21).

While scanning the document, the control unit 41 detects in accordance with the control signals outputted to the motor drive 421 a position of the light source unit 10 moved by the motor 422, to determine whether the light source unit 10 has entered a region near the edge position or not (S22). The region near the edge position means a region where the scanning light source unit 10 is positioned just before reaching the edge position. In other words, the region near the edge position means a region shifted by a predetermined range toward a side of the first light source 111 from the edge position. The control unit 41 prepares the distance of the predetermined range. Thus, when a distance from the position of the light source unit 10 to the edge position is no more than the distance of the predetermined range, the control unit 41 determines that the light source unit 10 has entered a region near the edge position. When the light source unit 10 has not entered a region near the edge position yet (S22: NO), the control unit 41 repeats the process to determine the position of the light source unit 10, while scanning the document.

When the light source unit 10 has entered a region near the edge position (S22: YES), the control unit 41 determines whether the document is a heavy paper document or not (S23). When the image forming apparatus has already accepted an instruction for specifying a type of the document as heavy paper document, the control unit 41 determines at step S23 that the document is a heavy paper document. When the document is not a heavy paper document (S23: NO), the control unit 41 then performs the process of step S15. When the document is a heavy paper document (S23: YES), the control unit 41 controls the first light quantity control circuit 113 and the second light quantity control circuit 114, to make the light quantity of the second light source 112 become larger than the light quantity of the first light source 111, while keeping a constant sum of the light quantity of the first light source 111 and the light quantity of the second light source 112 (S24). The control unit 41 then performs the process of step S15.

Figure 14:
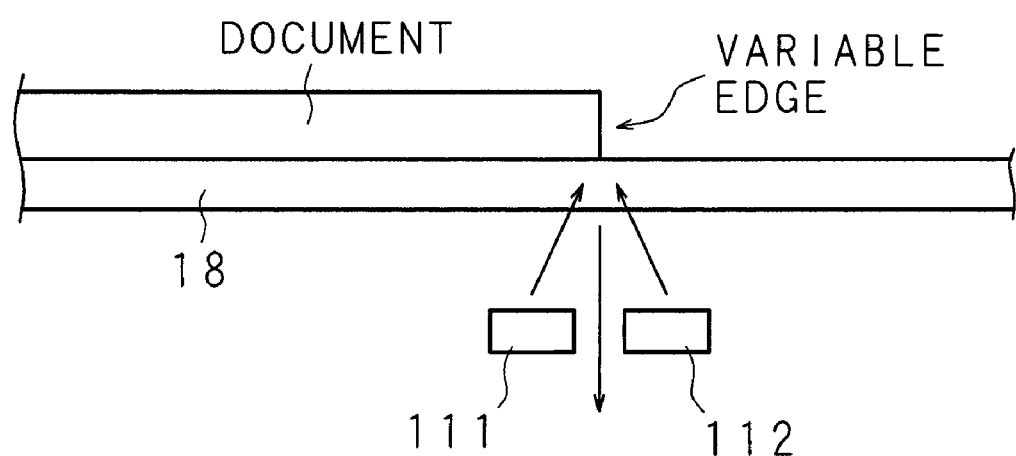
FIG. 14 is a schematic view showing a status in which light is emitted to a part near a variable edge of a heavy paper document.
Figure 15:
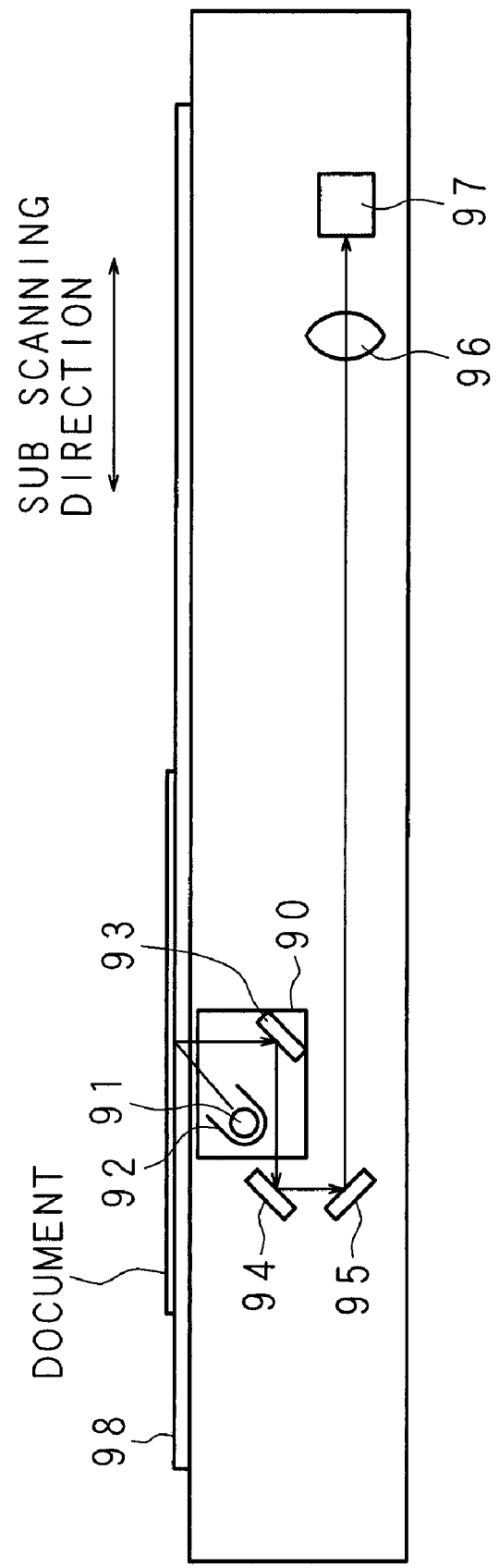
FIG. 15 is a schematic cross-sectional view showing a configuration of a conventional document read apparatus.
Figure 16:
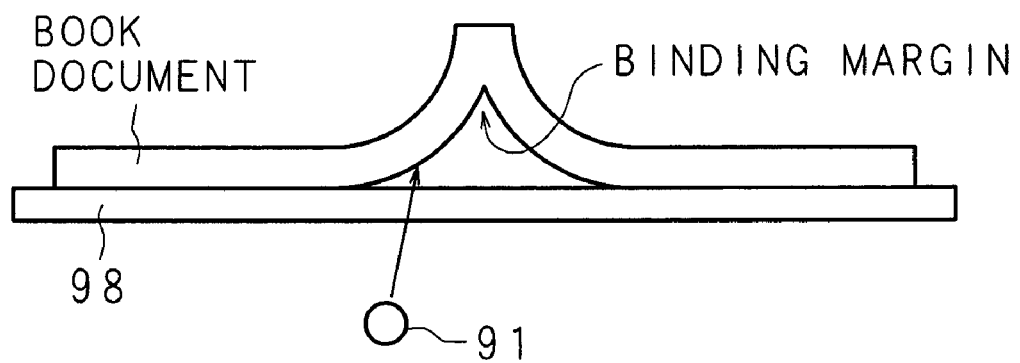
FIG. 16 is a schematic view showing a conventional document read apparatus for reading an image recorded on a book document.
Figure 17:
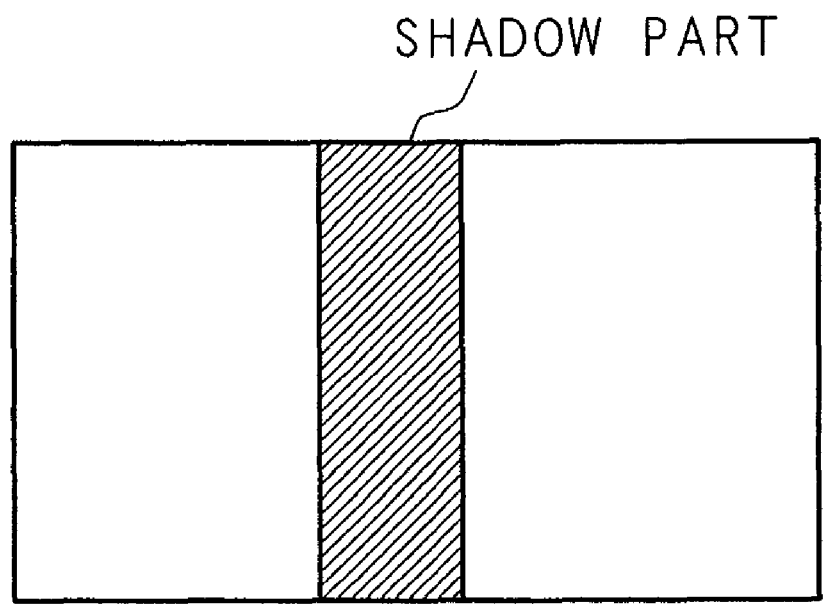
FIG. 17 is a schematic view showing a conventional image obtained by reading a book document.

FIG. 14 is a schematic view showing a status in which light is emitted to a part near a variable edge of the heavy paper document. Solid arrows represent light in the figure. The document sending unit 2 is configured to press a document placed on the document read unit 1 from above, when the document sending unit 2 is set in the closed position. However, when the document is a heavy paper document such as a post card or a name card, a space is formed outside of the heavy paper document between the scanner platen 18 and the pressing member that presses the document, because of the thickness of the heavy paper document. In this invention, when the light source unit 10 is in the region near the edge position, light is emitted to a region near the variable edge of the heavy paper document. In addition, light emitted by the second light source 112 is directed to the variable edge from outside the document. Thus, these configurations lead to advantages to facilitate emitting light to the variable edge. Furthermore, these configurations lead to advantages to implement efficiently emitting light to the variable edge of the heavy paper, by making the light quantity of the second light source 112 become larger than the light quantity of the first light source 111.

As described above, the image forming apparatus according to an aspect of the present invention arranges the linear first light source 111 aligned with the linear second light source 112 in the sub scanning direction, while the first light source 111 as well as the second light source 112 has a longitudinal direction parallel to the scanning direction. Furthermore, the image forming apparatus receives reflected light passing through between the first light source 111 and the second light source 112 to read a document, and separately controls the light quantity of the first light source 111 and the light quantity of the second light source 112 in accordance with a position of the movable light source unit 10. When the light source unit 10 is in the second region as shown in FIG. 10, the light quantity of the second light source 112 is controlled to become larger than the light quantity of the first light source 111. When the light source unit 10 is in the third region, the light quantity of the first light source 111 is controlled to become more than the light quantity of the second light source 112. Therefore, the image forming apparatus can efficiently receive with the image sensor 17 the light reflected by a part of a book document raised from the scanner platen 18, and can prevent a part of an image from becoming darker than the other part of the image, the part of an image obtained by reading the part of the book document raised from the scanner platen 18. Thus, the image forming apparatus according to an aspect of the present invention has advantages to prevent generation of a shadow part in an image obtained by reading a book document.

In addition, the image forming apparatus according to an aspect of the present invention keeps a constant sum of the light quantity of the first light source 111 and the light quantity of the second light source 112, when controlling the light quantities of the first light source 111 and the second light source 112. In other words, even when the image forming apparatus changes a ratio of the light quantity of the first light source 111 and the light quantity of the second light source 112, the image forming apparatus keeps the constant sum of the light quantity of the first light source 111 and the light quantity of the second light source 112. Thus, the image forming apparatus does not change the light quantity of light emitted to a part of a document closely contacting the scanner platen 18. Therefore, these configurations lead advantages to prevent an image obtained by reading a document from including a part too bright than the other part. Furthermore, the present invention results in keeping a substantial constant sum of electric power required for making the first light source 111 and second light source 112 emit light, because of the substantial constant sum of the light quantity of the first light source 111 and the light quantity of the second light source 112. Therefore, these configurations lead to advantages to prevent increase of the power consumption of the image forming apparatus.

When light is emitted to an edge of a heavy paper document, the image forming apparatus according to an aspect of the present invention makes one of the light quantities become larger than the other one of the light quantities, the "one of the light quantities" of a light source positioned outside the heavy paper document among the first light source 111 and the second light source 112. Thus, the image forming apparatus can efficiently emit light to the edge of the heavy paper document. The image sensor 17 receives light reflected by a part of the edge of the heavy paper document efficiently supplied with light. Thus, these configurations lead to advantages to prevent a part of an image from becoming darker than the other part of the image, the part of an image obtained by reading the part of the edge of the heavy paper document. Therefore, the image forming apparatus according to an aspect of the present invention has advantages to prevent generation of a shadow part caused by an edge of a document in an image obtained by reading a heavy paper document. As described above, the present invention leads to advantages to implement enhancing a quality of an image obtained by reading a document, without increasing power consumption.

The image forming apparatus according to an aspect of the present invention has been illustrated to control the light quantities in accordance with the positions of the light source unit 10 (i.e., depending upon whether the light source unit 10 is in the first region, second region, third region, or the fourth region) when reading an image recorded on a book document. It should be noted that the image forming apparatus according to an aspect of the present invention alternatively may control the light quantities depending on whether the position of the light source unit 10 is shifted from the center position toward a side of the first light source 111 or toward a side of the second light source 112. In the latter configurations, the image forming apparatus makes the light quantity of the second light source 112 become larger than the light quantity of the first light source 111, when the position of the light source unit 10 is shifted from the center position toward a side of the first light source 111 (i.e., the light source unit 10 is in the first region or the second region). On the other hand, in the latter configurations, the image forming apparatus makes the light quantity of the first light source 111 become larger than the light quantity of the second light source 112, when the position of the light source unit 10 is shifted from the center position toward a side of the second light source 112 (i.e., the light source unit 10 is in the third region or the fourth region). Specifically, the control unit 41 increases the light quantity of the second light source 112 at step S7, and skips steps S9, S10, S13 and S14 for the procedure. Thus, the procedure performed by the image forming apparatus is further simplified. Even with the simplified procedure, the image sensor 17 receives the light reflected by a part of a book document raised from the scanner platen 18. Thus, it is possible to prevent generation of a shadow part in an image obtained by reading a document. In addition, even with the simplified procedure, the image forming apparatus can maintain a constant light quantity of light emitted to a part of a document closely contacting the scanner platen 18, by keeping the constant sum of the light quantity of the first light source 111 and the light quantity of the second light source 112. Therefore, these configurations lead to advantages to prevent an image obtained by reading a document from including a part too bright than the other part. In other words, the present invention leads to advantages to implement enhancing a quality of an image obtained by reading a document, even with the simplified procedure.

In this embodiment, the present invention has been illustrated to predefine the fixed edge of a document placed on the scanner platen 18 and to scan a document from the fixed edge to the variable edge. However, it should be noted that the present invention is not limited to the illustration. For example, the image forming apparatus according to an aspect of the present invention may pre-scan a document placed on the scanner platen 18, set a range for scanning within an image obtained by pre-scanning, and may scan within the set range of the document. Even with these configurations, the present invention is implemented by the control of the light quantities of the first light source 111 and the second light source 112 in accordance with the position of the light source unit 10.

The image forming apparatus has been illustrated to align one corner of a book document with the fixed corner when the book document is placed on the scanner platen 18. However, it should be noted that the image forming apparatus is not limited to the illustration. The book document may be placed at a different position. In this case, there is no fixed edge. For example, a book document may be placed for the image forming apparatus, by aligning the center of the book document in the sub scanning direction with a predetermined position on the scanner platen 18. In these configurations, the center position of the light source unit 10 is predefined, the control unit 41 prepares information representing the center position, and the control unit 41 reads out the prepared information to locate the center position. Furthermore, in these configurations, the image forming apparatus specifies a size of a document and locates both edges of the document by pre-scanning or accepting instructions through user's handling, and scans the document from one edge to the other edge along the sub scanning direction. In addition, the image forming apparatus according to an aspect of the present invention, for example, may pre-scan to locate a document and may scan the located document, even when the document is placed at an arbitrary position on the scanner platen 18. In such case of no fixed edge, the image forming apparatus locates edge positions for both edges of a document in the sub scanning direction, and performs processes to prevent generation of shadow parts for the both edges.

Further, in this embodiment, it has been illustrated to perform processes for preventing generation of shadow parts caused by edges of a document, when a heavy paper document is scanned. However, the present invention is not limited to the illustration. The present invention may be configured to perform the processes for preventing generation of shadow parts caused by edges of a document, even when a document other than a heavy paper document is scanned. For example, the image forming apparatus according to an aspect of the present invention may perform the processes for preventing generation of shadow parts caused by edges of a document, even when a book document is scanned In this above embodiment, it has been illustrated that the document read apparatus according to an aspect of the present invention is built in the image forming apparatus. However, it should be noted that the document read apparatus is not limited to the illustration. For example, the document read apparatus may be a scanner device. In addition, the document read apparatus may be built in a facsimile device or a multi-function machine.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A document read apparatus for readinq an imaqe recorded on a document, comprising:
    a light emitting unit having a first light source and a second light source that emit light to a document;
    a light reception unit that receives the light reflected by the document;
    an optical system that conducts the light reflected by the document to the light reception unit;
    a light quantity control unit that separately controls a light quantity of the light emitted by the first light source and a light quantity of the light emitted by the second light source; and
    a movement control unit that moves the light emitting unit held to face the document;
    wherein
    the first light source and the second light source are linear light sources whose longitudinal directions are across a moving direction of the light emitting unit moved by the movement control unit, and are arranged in parallel to the moving direction;
    the light conducted by the optical system has passed between the first light source and the second light source; and
    the light quantity control unit separately controls, in accordance with a position of the light emitting unit moved by the movement control unit, the light quantity of the light emitted by the first light source and the light quantity of the light emitted by the second light source; and
    wherein
    when a position of the light emitting unit is shifted by over a predetermined distance toward a first light source side from a center position for emitting light to a center of the document in the moving direction, the light quantity control unit makes the light quantity of the light emitted by the first light source and the light quantity of the light emitted by the second light source equal to each other;

when a position of the light emitting unit is shifted by under the predetermined distance toward the first light source side from the center position for emitting light to the center of the document in the moving direction, the light quantity control unit makes the light quantity of the light emitted by the second light source become larger than the light quantity of the light emitted by the first light source;

when a position of the light emitting unit is shifted by under a predefined distance toward a second light source side from the center position for emitting light to the center of the document in the moving direction, the light quantity control unit makes the light quantity of the light emitted by the first light source become larger than the light quantity of the light emitted by the second light source; and when a position of the light emitting unit is shifted by over the predefined distance toward the second light source side from the center position for emitting light to the center of the document in the moving direction, the light quantity control unit makes the light quantity of the light emitted by the first light source and the light quantity of the light emitted by the second light source equal to each other.

2. A document read apparatus for reading an image recorded on a document, comprising:

a light emitting unit having a first light source and a second light source that emit light to a document;

a light reception unit that receives the light reflected by the document;

an optical system that conducts the light reflected by the document to the light reception unit;

a light quantity control unit that separately controls a light quantity of the light emitted by the first light source and a light quantity of the light emitted by the second light source; and a movement control unit that moves the light emitting unit held to face the document;

wherein the first light source and the second light source are linear light sources whose longitudinal directions are across a moving direction of the light emitting unit moved by the movement control unit, and are arranged in parallel to the moving direction;

the light conducted by the optical system has passed between the first light source and the second light source; and the light quantity control unit separately controls, in accordance with a position of the light emitting unit moved by the movement control unit, the light quantity of the light emitted by the first light source and the light quantity of the light emitted by the second light source; and wherein when a position of the light emitting unit is shifted toward a first light source side from a center position for emitting light to a center of the document in the moving direction, the light quantity control unit makes the light quantity of the light emitted by the second light source become larger than the light quantity of the light emitted by the first light source; and when a position of the light emitting unit is shifted toward a second light source side from the center position for emitting light to the center of the document in the moving direction, the light quantity control unit makes the light quantity of the light emitted by the first light source become larger than the light quantity of the light emitted by the second light source.

3. A document read apparatus for reading an image recorded on a document, comprising:

a light emitting unit having a first light source and a second light source that emit light to a document;

a light reception unit that receives the light reflected by the document;

an optical system that conducts the light reflected by the document to the light reception unit;

a light quantity control unit that separately controls a light quantity of the light emitted by the first light source and a light quantity of the light emitted by the second light source; and a movement control unit that moves the light emitting unit held to face the document;

wherein the first light source and the second light source are linear light sources whose longitudinal directions are across a moving direction of the light emitting unit moved by the movement control unit, and are arranged in parallel to the moving direction;

the light conducted by the optical system has passed between the first light source and the second light source;

the light quantity control unit separately controls, in accordance with a position of the light emitting unit moved by the movement control unit, the light quantity of the light emitted by the first light source and the light quantity of the light emitted by the second light source;

an to-irradiate-edge position locating unit that locates a position of the light emitting unit to irradiate the edge of the document in the moving direction with the light emitted by the light emitting unit, wherein when the light emitting unit is at the to-irradiate-edge position to irradiate the edge of the document in the moving direction, the light quantity control unit makes the light quantity of the light emitted by one light source among the first light source and the second light source become larger than the light quantity of the light emitted by the other light source among the first light source and the second light source, the one light source being farther from a center of the document in the moving direction than the other light source.

4. A document read apparatus for reading an image recorded on a document, comprising:

a light emitting unit having a first light source and a second light source that emit light to a document;

a light reception unit that receives the light reflected by the document;

an optical system that conducts the light reflected by the document to the light reception unit;

a light quantity control unit that separately controls a light quantity of the light emitted by the first light source and a light quantity of the light emitted by the second light source; and a movement control unit that moves the light emitting unit held to face the document;

wherein the first light source and the second light source are linear light sources whose longitudinal directions are across a moving direction of the light emitting unit moved by the movement control unit, and are arranged in parallel to the moving direction;

the light conducted by the optical system has passed between the first light source and the second light source; and the light quantity control unit separately controls, in accordance with a position of the light emitting unit moved by the movement control unit, the light quantity of the light emitted by the first light source and the light quantity of the light emitted by the second light source; and wherein the light quantity control unit keeps a constant sum of the light quantity of the first light source and the light quantity of the second light source.

5. A document read apparatus according to claim 1, further comprising:

a document size detection unit that detects a size of the document in the moving direction; and a to-irradiate-center position locating unit that locates a position of the light emitting unit to irradiate the center of the document in the moving direction with the light emitted by the light emitting unit, in accordance with the size detected by the document size detection unit.

6. A document read apparatus according to claim 1, further comprising:

an to-irradiate-edge position locating unit that locates a position of the light emitting unit to irradiate the edge of the document in the moving direction with the light emitted by the light emitting unit, wherein when the light emitting unit is at the to-irradiate-edge position to irradiate the edge of the document in the moving direction, the light quantity control unit makes the light quantity of the light emitted by one light source among the first light source and the second light source become larger than the light quantity of the light emitted by the other light source among the first light source and the second light source, the one light source being farther from a center of the document in the moving direction than the other light source.

7. A document read apparatus according to claim 1, wherein the light quantity control unit keeps a constant sum of the light quantity of the first light source and the light quantity of the second light source.

8. A document read apparatus according to claim 2, further comprising:

a document size detection unit that detects a size of the document in the moving direction; and a to-irradiate-center position locating unit that locates a position of the light emitting unit to irradiate the center of the document in the moving direction with the light emitted by the light emitting unit, in accordance with the size detected by the document size detection unit.

9. A document read apparatus according to claim 2, further comprising:

an to-irradiate-edge position locating unit that locates a position of the light emitting unit to irradiate the edge of the document in the moving direction with the light emitted by the light emitting unit, wherein when the light emitting unit is at the to-irradiate-edge position to irradiate the edge of the document in the moving direction, the light quantity control unit makes the light quantity of the light emitted by one light source among the first light source and the second light source become larger than the light quantity of the light emitted by the other light source among the first light source and the second light source, the one light source being farther from a center of the document in the moving direction than the other light source.

10. A document read apparatus according to claim 2, wherein the light quantity control unit keeps a constant sum of the light quantity of the first light source and the light quantity of the second light source.

11. An image forming apparatus, comprising:

a document read apparatus for reading an image recorded on a document, comprising:

a light emitting unit having a first light source and a second light source that emit light to a document;

a light reception unit that receives the light reflected by the document;

an optical system that conducts the light reflected by the document to the light reception unit;

a light quantity control unit that separately controls a light quantity of the light emitted by the first light source and a light quantity of the light emitted by the second light source; and a movement control unit that moves the light emitting unit held to face the document;

wherein the first light source and the second light source are linear light sources whose longitudinal directions are across a moving direction of the light emitting unit moved by the movement control unit, and are arranged in parallel to the moving direction;

the light conducted by the optical system has passed between the first light source and the second light source; and the light quantity control unit separately controls, in accordance with a position of the light emitting unit moved by the movement control unit, the light quantity of the light emitted by the first light source and the light quantity of the light emitted by the second light source; and an image forming unit that forms the image read by the document read apparatus.

12. An image forming apparatus, comprising:

a document read apparatus according to claim 1; and an image forming unit that forms the image read by the document read apparatus.

13. An image forming apparatus, comprising:

a document read apparatus according to claim 2; and an image forming unit that forms the image read by the document read apparatus.

14. An image forming apparatus, comprising:

a document read apparatus according to claim 3; and an image forming unit that forms the image read by the document read apparatus.

15. An image forming apparatus, comprising:

a document read apparatus according to claim 4; and an image forming unit that forms the image read by the document read apparatus.

* * * * *